(12) United States Patent
Van Looveren et al.

(10) Patent No.: US 8,618,227 B2
(45) Date of Patent: *Dec. 31, 2013

(54) PROCESS FOR IMPROVING THE DEVOLATILIZATION OF POLYMER SLURRY PRODUCED IN A POLYMERIZATION REACTOR

(71) Applicant: Total Research & Technology Feluy, Seneffe (BE)

(72) Inventors: Lieven Van Looveren, Mielen-Boven-Aalst (BE); Marc Moers, Antwerp (BE); Mathias Wijffels, Antwerp (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/693,465

(22) Filed: Dec. 4, 2012

(65) Prior Publication Data

US 2013/0102741 A1 Apr. 25, 2013

Related U.S. Application Data

(63) Continuation of application No. 12/447,781, filed as application No. PCT/EP2007/061547 on Oct. 26, 2007, now Pat. No. 8,372,923.

(30) Foreign Application Priority Data

Oct. 30, 2006 (EP) ..................................... 06123169

(51) Int. Cl.
*C08F 2/00* (2006.01)
*C08F 210/00* (2006.01)
*B01J 19/18* (2006.01)

(52) U.S. Cl.
USPC ................ 526/64; 526/68; 526/348; 422/132

(58) Field of Classification Search
USPC ............................... 526/64, 68, 348; 422/132
See application file for complete search history.

(56) References Cited

U.S. PATENT DOCUMENTS 8,372,923 B2 * 2/2013 Van Looveren et al. ........ 526/64

* cited by examiner

*Primary Examiner* — William Cheung

(57) ABSTRACT

The present invention relates to a process for improving the devolatilization of polymer slurry produced in an olefin polymerization reactor. The process is characterized in that it involves an adjustment of the temperature of the interior surface of the flash line for periodically transferring polymer slurry from the polymerization reactor to a downstream processing unit. In particular, in accordance with the present process, the temperature of the interior surface of the flash line is adjusted to a temperature which is equal to or higher than the softening temperature of the polymer passing through said flash line whereby said temperature is higher in a first half of the length of the flash line than in the remaining length of the flash line.

7 Claims, 1 Drawing Sheet

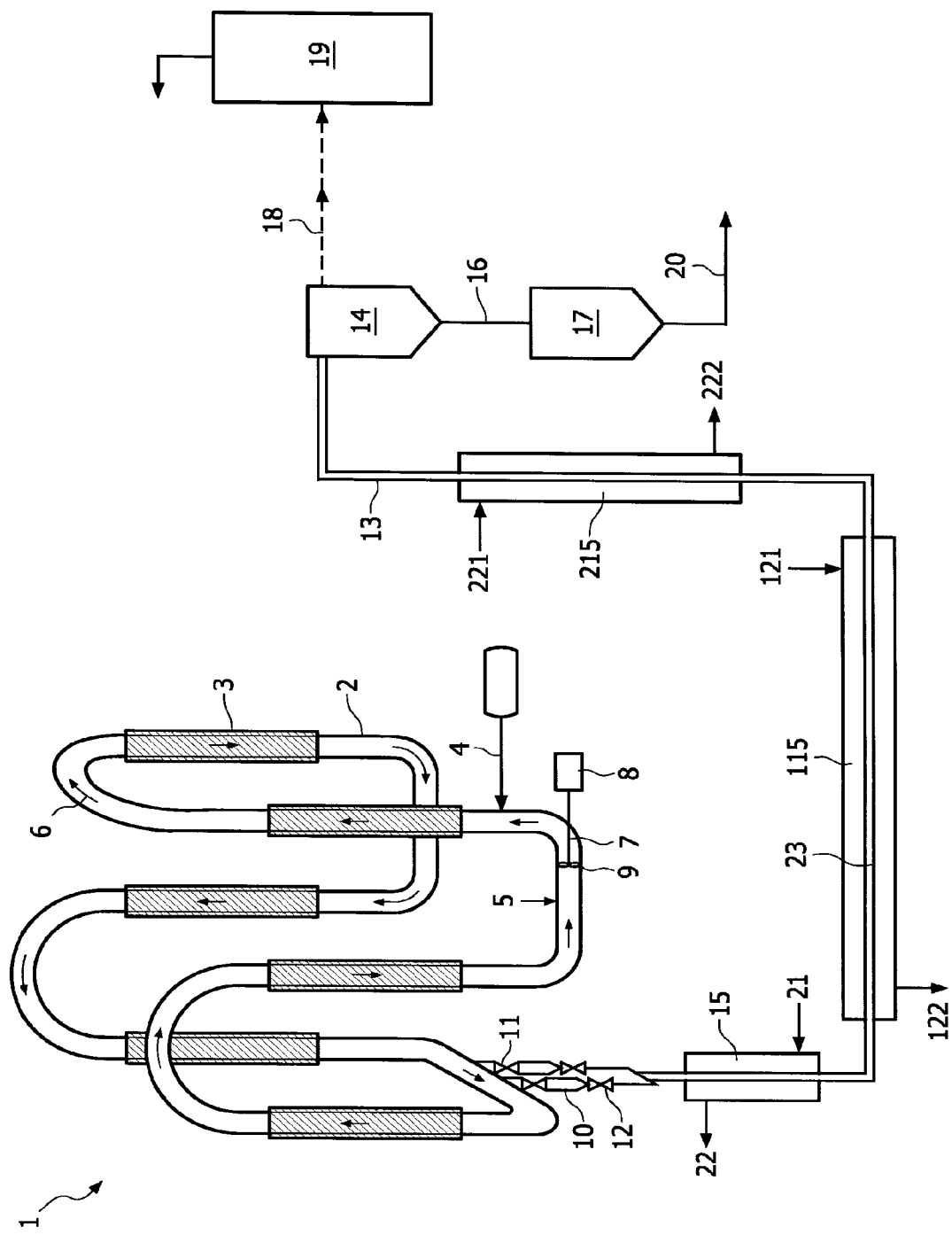

PROCESS FOR IMPROVING THE DEVOLATILIZATION OF POLYMER SLURRY PRODUCED IN A POLYMERIZATION REACTOR

CROSS-REFERENCE TO RELATED APPLICATIONS

This application is a continuation of U.S. application Ser. No. 12/447,781, filed on Sep. 24, 2010, now U.S. Pat. No. 8,732,923, which claims the benefit of PCT/EP2007/061547, filed Oct. 26, 2007, which claims priority from EP 06123169.2, filed Oct. 30, 2006.

TECHNICAL FIELD

The present invention relates to the field of olefin polymerization. In particular, the present invention relates to a process for improving the devolatilization of polymer slurry produced in an olefin polymerization loop reactor.

BACKGROUND

Polyethylene (PE) is synthesized by polymerizing ethylene ($CH_2$=$CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using monomer, liquid diluent and catalyst, one or more optional co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled. The polymer particles are dried, additives can be added and finally the polymer may be extruded and pelletized.

In passing from the reactor to the flash tank the pressure drops and the polymer slurry is partially devolatilized, i.e. the volatile components thereof are removed. Insufficient devolatilization of polymer slurry may ultimately result in polymer end products that contain an undesired amount of diluent and/or unreacted reactants, such as e.g. (co-)monomer(s). Devolatilization is improved with higher temperature of the polymer slurry resulting in lower content of volatiles in the polymer. However, high temperatures in the flash lines induce fouling problems, i.e. sticking of polymer product to the interior walls of the flash lines, and degradation of the polymer particles in the flash lines. On the other hand, in the flash lines where temperatures are too low, devolatilization of the polymer slurry turns out to be insufficient, resulting in polymer end products having unsatisfactory properties and qualities.

U.S. Pat. No. 3,428,619 discloses a method for transferring polymer slurry from a polymerization reactor to a flash tank via a transfer line wherein the liquid diluent is substantially vaporized and the polymer particles are dried during the transfer. The transfer line comprises a plurality of externally heated zones, for instance two or four zones, of varying size. The method comprises controlling the flow rate of the materials flowing through the different zones. The external heating of the zones is carried out at a temperature sufficiently elevated to vaporize the liquid present on the solid particles but which is below the softening temperature of the polymer particles.

In view of the above, there remains a need in the art for providing an improved process for the devolatilization of polymer slurry issued from a polymerization reactor.

The present invention aims to provide an improved process for the devolatilization of polymer slurry produced in a polymerization reactor. More in particular, the present invention aims to provide a process wherein devolatilization of polymer is improved.

SUMMARY

In a first aspect, the present invention therefore relates to a process for improving the devolatilization of polymer slurry produced in a polymerization reactor. The process comprises the steps of:
  introducing ethylene monomer, one or more optional olefin co-monomer(s), and a diluent into a loop reactor,
  feeding at least one polymerization catalyst into the reactor,
  polymerizing said ethylene monomer and said optional co-monomer(s) to produce a polymer slurry comprising essentially liquid diluent and solid ethylene polymer particles,
  periodically withdrawing said polymer slurry from said polymerization reactor, and
  passing said withdrawn polymer slurry through a heated flash line into a flash tank, said flash line having an interior surface.

The process is in particular characterized in that the temperature of the interior surface of the flash line is adjusted to a temperature which is equal to or higher than the softening temperature of the polymer passing through said flash line, whereby said temperature is higher in a first half of the length of the flash line than in the remaining length of the flash line.

The term "periodically" withdrawing or discharging polymer as used herein refers to a process wherein there is a periodical withdrawal or discharge of polymer slurry from the polymerization reactor. In accordance with the present invention, the polymer slurry is discharged through one or more settling legs, and transferred through one or more heated flash lines into a flash tank.

The softening temperature of the polymer passing through said flash line is measured according to standard ISO 306: 2004, method A50. The melting point of the polymer passing through said flash line is measured according to standard ISO 3146:2004, method A50.

The present invention provides a proper design of the temperature of flash lines in order to improve polymer slurry devolatilization. In prior art systems, polymer slurry is heated in flash lines to a temperature which is below its softening temperature in order to avoid above-mentioned fouling and degradation problems. In contrast, in accordance with the present invention polymer slurry is heated in a flash line to a temperature which is equal to or higher than its softening temperature without inducing fouling or degradation problems. By adjusting the temperature of the interior surface of flash lines improved vaporization is obtained of unreacted reactants present in the polymer slurry, such as diluent and/or (co)-monomer(s). The present process thus provides improved separation of unreacted reactants from the polymer particles.

Furthermore, in accordance with the present process a mixture of gas and polymer solids is obtained that leaves the flash lines to enter a flash tank. The polymer solids leave the flash lines at a higher temperature. Such polymer solids are in consequence easier to further devolatilize in downstream processes. The need for expensive downstream flashing and drying operations of the obtained polymer is therefore significantly reduced, since substantial vaporization already occurs in the flash line zone and also because of the higher temperature of the polymer particles leaving the flash line.

In a second aspect, the invention relates to a flash line for periodically transferring a polymer slurry from a polymerization reactor to a flash tank comprising a pipe which is adapted to receive said polymer slurry, and which is provided with a jacket surrounding said pipe, said jacket being adapted for receiving a heating fluid, whereby said flash line comprises control means for adjusting the temperature of the interior surface of the pipe to a temperature which is equal to or higher than the softening temperature of the polymer passing through said pipe, and which is higher in a first half of the length of the flash line than in the remaining length of the flash line.

In a preferred embodiment the flash line according to the invention is connected with one or more settling legs, and preferably with at least two settling legs, for periodically transferring polymer slurry from said settling legs to a flash tank.

The present invention will now be disclosed in further detail hereunder. The description is only given by way of example and does not limit the invention. The reference numbers relate to the hereto-annexed FIGURE.

DESCRIPTION OF THE FIGURES

FIG. 1 is a schematic representation of a process and apparatuses for the devolatilization of polymer slurry produced in a polymerization reactor.

DETAILED DESCRIPTION OF THE INVENTION

The present invention is especially applicable to the polymerization process of ethylene. Suitable "ethylene polymerization" includes but is not limited to homopolymerization of ethylene or co-polymerization of ethylene and at least one olefin co-monomer in presence of a polymerization catalyst. Ethylene polymerization comprises feeding to a reactor the reactants including the monomer ethylene, one or more optional co-monomer(s), a diluent, a catalyst, optionally a co-catalyst, and a terminating agent such as hydrogen.

Olefin co-monomers which are suitable for being used in accordance with the present invention may comprise but are not limited to aliphatic $C_3$-$C_{20}$ alpha-olefins. Examples of suitable aliphatic $C_3$-$C_{20}$ alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene. In a preferred embodiment of the present invention, said co-monomer is 1-hexene. However, it should be clear from the present invention that other co-monomers may as well be applied according to the present invention.

Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Nonlimiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used herein, the term "polymerization slurry" or "polymer slurry" or "slurry" means a substantially two-phase composition including liquid and polymer solids. The solids include catalyst and a polymerized olefin, such as polyethylene. The liquids may comprise an inert diluent, such as isobutane, with dissolved monomer such as ethylene, a molecular weight control agent such as hydrogen, optional co-monomer(s), one or more antistatic agents, antifouling agents, scavengers, or other process additives.

Suitable catalysts and co-catalysts for use in the polymerization of ethylene are well known in the art. The polymerization catalyst used in combination with the present invention can for example be a metallocene-based catalyst, a Ziegler-Natta catalyst or a chromium catalyst.

The present invention relates to a process for improving the devolatilization of polymer slurry produced in a polymerization loop reactor. The process involves an adjustment of the temperature of the interior surface of the flash line. The term "flash line" as used herein refers to an elongated jacketed pipe, the interior of which is heated indirectly by running a heating medium through the jacket. The polymer slurry is vaporized in the pipe utilizing the heat supplied from condensing fluid in the jacket surrounding the pipe. The fluid may be steam, which flows through the jacket in a direction which is countercurrent to the flow direction of the polymer slurry in the pipe. In a preferred embodiment, the flash line comprises control means for adjusting the temperature of the interior surface of the pipe to a temperature which is equal to or higher than the softening temperature of the polymer passing through said pipe.

The flash line may be divided in different flash line zones, corresponding to different pipe parts, having a same or a different diameter. Each of said flash line zones may comprise control means for adjusting the temperature of the interior surface of the pipe of said different flash line zones. In particular, each pipe part may be provided with a jacket and heated using the heat supplied from the fluid in the jacket. Preferably the flash line comprises at least 3, and preferably at least 4 zones. In a preferred embodiment the flash line comprises between 4 and 10 flash line zones, and for instance 5, 6, 7, 8 or 9 zones.

The temperature of the interior surface of the flash line or a zone thereof corresponds to the temperature of the interior surface of the pipe of the flash line or a zone thereof. The temperature of the interior surface of the flash line or a zone thereof will be adjusted to a temperature which is equal to or higher than the softening temperature of the polymer passing through said flash line. The control means for adjusting the temperature of the interior surface of the pipe of the flash line (zones) comprise means for adjusting temperature, pressure and/or flow of the heating fluid heating said flash line (zones).

While polymer slurry flows through the flash line, it will be heated and vaporization occurs at least partially within the flash line. In accordance with the invention, a large portion of the liquid of the polymer slurry is vaporized by the time the polymer material reaches the flash tank. The material flowing through the flash line near the polymerization reaction will thus mainly comprise liquid and polymer solids, while the material flowing through the flash line near the flash tank will mainly comprise vapour (gas) and polymer solids.

Surprisingly, despite the fact that the polymer slurry in the flash line is heated to a temperature which is above its softening point, the polymer does not accumulate and/or agglomerate in the flash lines. No plugging problems of the flash lines occur. A mixture of vapor and heated polymer solid particles arrives at the flash tank, in which the vapors are separated and removed from the heated dry polymer particles. The particles are collected for further drying and processing as desired.

In one embodiment, the temperature of the interior surface of the flash line may be the same in different zones of the flash line.

In a preferred embodiment, the temperature of the interior surface of the flash line varies in different zones thereof. For instance, the temperature of the interior surface of the flash line may be higher in zones located near the reactor outlet than in zones located near the flash tank inlet. In a particularly preferred embodiment, the invention relates to a process wherein the temperature of the interior surface of the flash line is higher in the first half, and preferably the first third of the length of the flash line than in the remaining length of the flash line. With the terms a or the "first third" or a or the "first half" of the length of the flash line is meant that part of the flash line that is closest to the polymerization reactor. Preferably, the temperature of the interior surface of the flash line in the first half, and preferably in the first third of the length of the flash line is up to 70%, 60%, 50%, 40%, 35%, 30%, 25%, 20%, 15%, or 10% higher than the temperature in the remaining length of the flash line.

In a preferred embodiment, a process is provided according to the invention, wherein the temperature of the interior surface of the flash line is up to 10% higher, and for instance up to 10%, 15%, 20%, 25%, 30%, 35%, 40%, 50%, 60% or 70% in the first half, and preferably the first third, of the length of the flash line than in the remaining length of the flash line.

In a preferred embodiment, the process according to the present invention, comprises periodically withdrawing (or discharging) said polymer slurry from said polymerization reactor by means of one or more settling legs, and passing said withdrawn (or discharged) polymer slurry from said settling legs through one or more heated flash lines into a flash tank. Preferably the invention provides a process comprising periodically withdrawing polymer slurry from a polymerization reactor by means of at least two settling legs, and for instance by means of 2, 3, 4, 5, 6, 7, 8, 9, or 10 settling legs, and passing said withdrawn polymer slurry from said settling legs through one or more heated flash line, and for instance to through one single heated flash line, into a flash tank.

The temperature of the interior surface of the flash line or a zone thereof is adjusted by adjusting pressure, temperature, and/or flow of the fluid heating said flash line or a zone thereof.

In one embodiment, the process comprises adjusting the temperature of the interior surface of the flash line by adjusting the pressure of the liquid, preferably steam, heating said flash line. Preferably, the steam pressure is at most 2.5 barg, and for instance 0.5, 0.7, 0.9, 1.0, 1.1, 1.5, 2 or 2.5 barg. The term "barg" as used herein stands for bar gauge and gives the difference between atmospheric pressure and an internal pressure (bar=barg+1). In one preferred embodiment, the present process comprises keeping the pressure of the liquid, preferably steam, heating said flash line at a maximum pressure of for instance 2.5 barg along the length of the flash line. In another embodiment, however, the present invention may also relate to a process wherein the pressure of the fluid heating the flash line or a zone thereof is higher in the first half, and preferably the first third of the length of the flash line than in the remaining length of the flash line. For instance, the pressure of the fluid heating the flash line in the first half, and preferably in the first third of the length of the flash line is up to 70%, 60%, 50%, 40%, 35%, 30%, 25%, 20%, 15%, or 10% higher than the pressure of the fluid heating the flash line in the remaining length of the flash line.

In another embodiment, the process comprises adjusting the temperature of the interior surface of the flash line by adjusting the temperature of the liquid, preferably steam, heating said flash line. In a preferred embodiment, the steam temperature is up to 95, 100, 105, 110, 115, 120, 125, 130, 135, or 139° C. The temperature of the fluid heating the flash line or a zone thereof is higher in the first half, and preferably the first third of the length of the flash line than in the remaining length of the flash line. For instance, the temperature of the fluid heating the flash line in the first half, and preferably in the first third of the length of the flash line is up to 70%, 60%, 50%, 40%, 35%, 30%, 25%, 20%, 15%, or 10% higher than the temperature of the fluid heating the flash line in the remaining length of the flash line. In a preferred embodiment, the difference in temperature of the liquid (steam) heating the flash line and the softening temperature of the polymer transported in the flash line is equal to or more than 10° C., and for instance more than 11, 12, 13, 14 or 15° C.

In yet another embodiment, the process comprises adjusting the temperature of the interior surface of the flash line by adjusting the flow of the liquid, preferably steam, heating said flash line. In a preferred embodiment, the steam flow is higher in the first half, and preferably the first third of the length of the flash line than in the remaining length of the flash line. For instance, the flow of the fluid heating the flash line in the first half, and preferably in the first third of the length of the flash line is up to 70%, 60%, 50%, 40%, 35%, 30%, 25%, 20%, 15%, or 10% higher than the flow of the fluid heating the flash line in the remaining length of the flash line.

In another preferred embodiment, the invention relates to a process as defined herein, wherein the flash tank is operated at a pressure of between 0.1 and 4 bar, and preferably at a pressure of between 0.2 and 3 bar.

The present process may be applied in a double loop polymerisation reactor consisting of two liquid full loop reactors. The reactors are connected in series by one or more settling legs of the first reactor connected for discharge of slurry from the first reactor to said second reactor. Polymer slurry issued from the second loop may be discharged through flash lines to a product recovery zone, including a flash tank. The temperature of the interior surface of the flash lines can be adjusted in accordance with the invention to be at least the equal to or higher than the softening temperature of the polymer particles in the line.

Referring now to FIG. 1 a polymerization loop reactor 1 is represented consisting of a plurality of interconnected pipes. The vertical sections of the pipe segments 2 are provided with jackets 3. Polymerization heat can be extracted by means of cooling water circulating in these jackets of the reactor. Reactants are introduced into the reactor 1 by feeding line 4. Catalyst, optionally in conjunction with a co-catalyst or activation agent, is injected in the reactor 1 by means of the conduct 5. Normally the catalyst is introduced as a suspension in hydrocarbon diluent. The polymerization slurry is directionally circulated throughout the loop reactor 1 as illustrated by the arrows 6 by one or more pumps, such as axial flow pump 7. The pump may be powered by an electric motor 8. As used herein the term "pump" includes any device from compressing driving, raising the pressure of a fluid, by means for example of a piston or set of rotating impellers 9. The illustrated reactor 1 is further provided with two settling legs 10 connected to the pipes of the reactor 1. As the polymerization progresses polymer slurry accumulates in these settling legs 10. The settling legs 10 are provided with an isolation valve 11. These valves 11 are open under normal conditions and can be closed for example to isolate a settling leg from operation. Further the settling legs are provided with product take off or discharge valves 12. The discharge valves 12 may be any type of valve, which can permit continuous or periodical discharge of polymer slurry, when they are fully open. Polymer slurry settled in the settling legs 10 is removed by means of flash lines 13 to a product recovery zone, including a flash tank 14.

As shown on FIG. 1, two settling legs are provided for allowing periodic discharge of polymer slurry from the polymerization reactor and both settling legs are connected to a single flash line 13. The withdrawn polymer slurry is passed from said two settling legs through a single heated flash line into a flash tank. It shall however be understood that more than two and for instance 3, 4, 5, 6, 7, 8, 9, 10 settling legs can be provided, that are all connected to one or more flash lines, and for example to a single flash line.

Partial volatilization of unreacted reactants occurs in the flash lines. Unreacted reactants are further separated from the incoming polymer solids in the flash tank 14. Within the flash tank 14 unreacted reactants are removed as vapor via conduit 18. The gas flowing through conduit 18 can be transferred to a recycle section 19, where the reactants in the gas are separated and if desired re-fed to the polymerization reactor 1. Polyethylene powder is removed from the tank 14 through conduit means 16 which conduct the polyethylene powder to a purge column 17. Herein, the PE powder is further treated to remove any remaining (co-)monomer(s) and diluent. Treated PE powder is then removed through conduit means 20.

FIG. 1 represents a single flash line, although it shall be clear that more than one flash line may be provided to connect the reactor 1 with a flash tank 14. The flash line 13 is a conduit which comprises a series of jackets 15, 115, 215. The jackets delimit different flash line zones. In FIG. 1 three flash line zones are represented. However, more than three flash line zones may be provided on a flash line in accordance with the present invention.

Advantageously, the present process and the present flash line can be operated even when the flash tank is operated at a pressure of between 0.1 and 4 bar, and preferably of between 0.2 and 3 bar, and for instance of 0.4 bar, although the operational conditions of the flash lines are less flexible in view of such relatively low pressure conditions. The present invention overcomes this difficulty and advantageously provides a process which enables to carefully adjust the operational conditions of the flash line(s) and in particular the temperature of the interior surface of the flash line(s).

For example, during transfer from reactor 1 to flask tank 14 the pressure drops from e.g. about 40 bar to e.g. about 400 mbar, and polymer slurry is partially devolatilized in the flash line 13. Further devolatilization is effected by adjusting the temperature in the flash line 13. The temperature in the flash line is adjusted by adjusting the temperature, pressure and/or flow, and preferably by adjusting the pressure of a heated fluid, e.g. steam, flowing through jackets 15, 115, 215. The steam flows in a direction countercurrent to the direction the polymer slurry flow in the flash line. The steam is introduced in the jackets 15, 115, 215 by lines 21, 121, 221, respectively, and withdrawn from the jackets by lines 22, 122, 222. The steam provides indirect heating of the polymer slurry in flash line 13, such that the polymer slurry is vaporized in the line 13. In accordance with the present invention, the temperature, pressure and/or flow, of the steam is controlled and adjusted such that the temperature of the interior surface 23 of the flash line 13 corresponds to or is higher than the softening temperature of the polymer particles in the line 13. When the flash line's interior surface is heated to such temperature, liquid vaporization in addition to vaporization effected by pressure reduction in line 13 is sufficient to volatilize a substantial part of the liquid present in the line 13. Preferably, the conduit 13 is of sufficient length and diameter to permit transporting polymer slurry that expands due to pressure reductions and vaporization.

EXAMPLES

The following example illustrates that degassing of a PE polymer slurry produced in a polymerization loop reactor can be improved by adjusting the temperature of the interior surface of the flash line to a temperature which is equal to or higher than the softening temperature of the polymer passing through said flash line.

In this example, a first PE slurry was passed through a flash line wherein temperature of the interior surface of the flash line was not adjusted. A second PE slurry was passed through a flash line wherein temperature of the interior surface of the flash line was adjusted by adjusting pressure of the fluid heating said flash line. In both cases, a mixture of gas and polymer solids was obtained that left the flash lines to enter a flash tank. Results of this comparative experiment are summarized in Table 1.

TABLE 1

|  | first PE slurry | second PE slurry |
|---|---|---|
| isobutane (kg/hour) | 7195 | 5925 |
| PE (kg/hour) | 9800 | 8990 |
| Temperature in polymerization reactor (° C.) | 90 | 90 |
| Pressure in polymerization reactor (barg) | 39 | 39 |
| pressure in flash tank (barg) | 0.41 | 0.40 |
| action | standard pressure profile | +1 bar(g) |
| flash temperature (° C.) | 58 | 51 |

It can be derived from Table 1 that the polymer solids that are derived from the second PE slurry leave the flash lines at a higher temperature than the polymer solids derived from the first PE slurry (Flash temperature of 58° C. versus 51° C.—a gain of 7° C.). As a consequence thereof, it is easier and more efficient to further devolatilize polymer solids that are derived from the second PE slurry in downstream processes.

The invention claimed is:
1. A process for improving the devolatilization of polymer slurry produced in a polymerization loop reactor comprising:
introducing ethylene monomer, one or more optional olefin co-monomers and a diluent into a loop polymerization reactor;
introducing at least one polymerization catalyst into the reactor;
polymerizing the ethylene monomer and the optional co-monomer to produce a polymer slurry comprising liquid diluent and solid ethylene polymer particles;

periodically withdrawing the polymer slurry from the polymerization reactor; and passing withdrawn polymer slurry through a heated flash line into a flash tank, wherein a temperature of an interior surface of the flash line is adjusted to a temperature which is equal to or higher than a softening temperature of the polymer particles passing therethrough and wherein the temperature of the interior surface is higher in a first half of the length of the flash line than in a remaining length of the flash line.

2. The process of claim 1, wherein the flash line comprises different flash line zones, and wherein the temperature of the interior surface of the flash line varies in the different zones.

3. The process of claim 1, wherein the temperature of the interior surface of the flash line or a zone thereof is adjusted by adjusting temperature, pressure and/or flow of the fluid heating the flash line or a zone thereof.

4. The process of claim 1, wherein the temperature of the interior surface of the flash line is up to 10% higher in the first half of the length of the flash line than in the remaining length of the flash line.

5. The process of claim 1 further comprising periodically withdrawing the polymer slurry from the polymerization reactor through one or more settling legs; and passing the withdrawn polymer slurry from the settling legs through one or more heated flash lines into a flash tank.

6. The process of claim 5, wherein the one or more settling legs comprise at least two settling legs.

7. The process of claim 1, wherein the flash tank is operated at a pressure of between 0.1 and 4 bar.

* * * * *